Dec. 30, 1958 — G. GLUCHOWICZ — 2,866,671
DEVICE FOR DRIVING RAPIDLY ROTATING SPINDLES
Original Filed May 20, 1952 — 2 Sheets-Sheet 1

Dec. 30, 1958 G. GLUCHOWICZ 2,866,671
DEVICE FOR DRIVING RAPIDLY ROTATING SPINDLES
Original Filed May 20, 1952 2 Sheets-Sheet 2
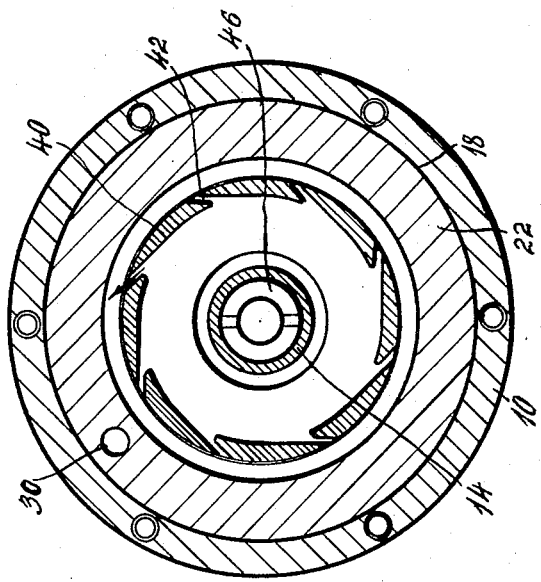
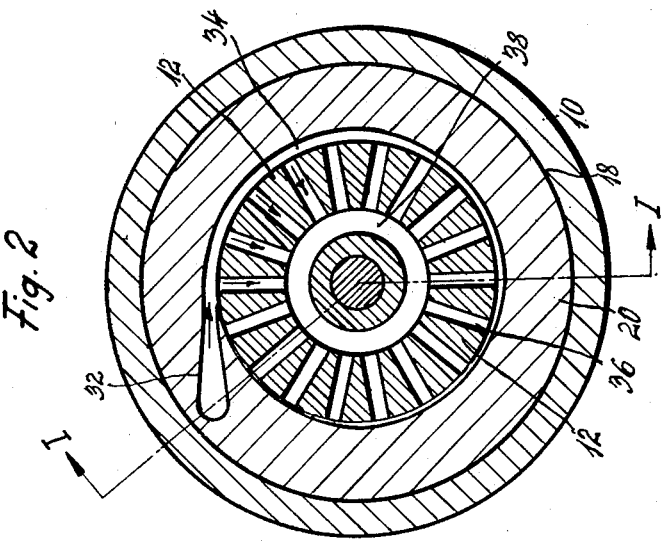

2,866,671

DEVICE FOR DRIVING RAPIDLY ROTATING SPINDLES

Gerszon Gluchowicz, Hagersten, Sweden

Original application May 20, 1952, Serial No. 288,834. Divided and this application July 20, 1955, Serial No. 523,150

Claims priority, application Sweden December 22, 1951

1 Claim. (Cl. 308—189)

This application is a divisional application relating back to my co-pending application Serial No. 288,834 filed May 20, 1952, now abandoned.

This invention relates to a bearing device for high speed spindles, for example, those rotated by a turbine wheel adapted to be driven by a gaseous working medium, and to rotate during idle running at a so-called "racing" number of revolutions. Turbines of this type may be constructed for very high rotational speeds, such as 60,000–100,000 revolutions per minute or higher, and are used, inter alia, for the rotation of grinding discs.

One main object of the invention is to provide an improved bearing structure producing an accurate centering of a shaft or spindle rotating at high speeds.

Further objects and advantages of the invention will be apparent from the following description considered in connection with the accompanying drawings, which form a part of this specification, and of which:

Figs. 2 and 3 are sections on lines II—II and III—III of Fig. 1, respectively.

Figure 1:
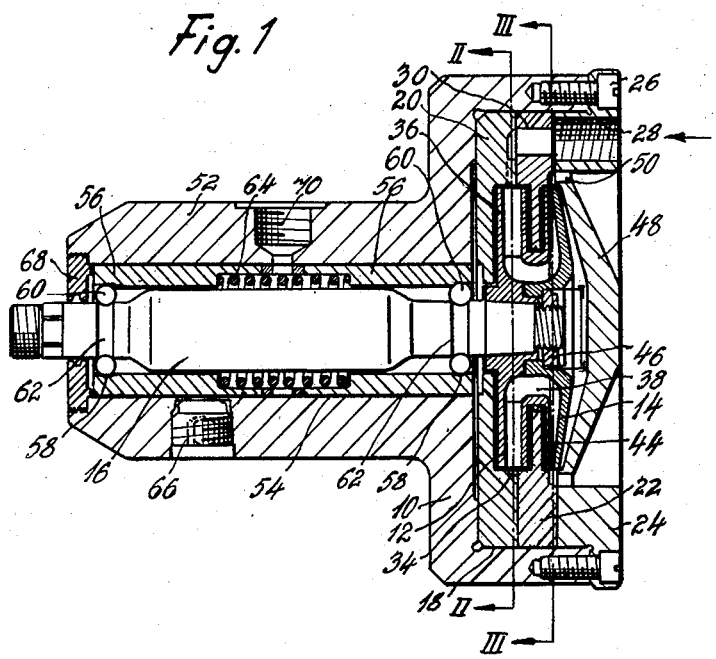
Fig. 1 is a longitudinal section on the line I—I of Fig. 2 through a combined impulse and reaction turbine adapted to drive a grinding spindle and through the bearing of the turbine shaft.

Referring to the drawings, 10 designates a turbine housing containing an impulse wheel 12 and a reaction wheel 14 mounted therein on a shaft 16. The housing is provided with a cylindrical recess 18 enclosing discs 20, 22, adapted to the shape of the turbine wheels and retained in position by a ring 24 secured to the housing by means of screws 26.

The working medium, normally air, is supplied to the turbine through a conduit (not shown) in threaded connection with an aperture 28 in the ring 24, whence the air passes axially through an aperture 30 in the disc 22. The aperture 30 merges into an expansion nozzle 32, in which part of the superatmospheric pressure of the air is transformed into velocity. The nozzle 32 opens tangentially into a helically formed space 34 located externally of the impulse wheel 12 at the axially central zone thereof. A plurality of such supply nozzles may, if desired, be arranged around the periphery of the wheel. The impulse wheel is formed with a number of circumferentially spaced channels 36 opening at their outer ends into the helical space 34 and extending inwardly, preferably radially towards the centre of the wheel. The channels 36 may be in the form of straight bores.

The impulse wheel 12 is formed inwardly of the channels 36 to provide an annular space 38 curved in an axial direction toward the reaction wheel 14. The latter is provided with channels 42 formed between blades 40, said channels having a considerably smaller radial dimension than that of the channels 36, and their outer ends may be located at the same or approximately the same radius as the channels 36. The channels 42 extend obliquely outwardly and forwardly in the direction of flow of the gas so as to produce a reaction effect. The impulse wheel 12 may be formed with an annular flange 44, constituting the inner lateral boundary for the flow channels 42 in the reaction wheel 14. The two wheels are retained on the shaft 16 by a nut 46. A stationary cover 48 is arranged outside the reaction wheel 14 and is provided with openings 50 for escape of air issuing from the reaction wheel.

It is of particular importance that the rotating parts of a turbine rotating at speeds of revolution as high as those previously mentioned are accurately centered relative to the stationary turbine housing, without uncontrollable pressures being produced in the bearings. To this end, the housing 10 is extended axially to form a bearing housing 52 of comparatively large axial dimensions. Two bearing sleeves 56 are inserted with sliding fit into a cylindrical bore 54 in said bearing housing and are formed with grooves or offsets 58 in their end portions remote from one another, said grooves each forming the outer race for a row of balls 60. The axial length of the bearing sleeves is larger than the diameter of the race. The shaft 16 is formed with dished grooves 62 forming the inner races of the respective rows of balls.

Arranged between the two bearing sleeves 56 is a spring 64 forcing the grooves 58 of the sleeves to bear against the two rows of balls 60, so that the shaft will be fixed in axial direction with respect to the bearing sleeves 56 at a pressure determined by the spring 64. After the turbine wheels have been fitted into their proper axial positions one of the sleeves 56 is locked by means of a screw device 66 acting in a radial direction on the outer cylindrical sleeve surface. The bearing sleeves 56 ensure by their considerable length that the races are accurately oriented in planes at right angles to the shaft independently of any abutments for the axial fixing of the sleeves in the bearing housing. A sealing plate 68 may be arranged at the free end of the shaft and an aperture 70 formed radially of the housing 52 serves for the application of a lubricator cup or the like.

The turbine operates in the following manner: Air is supplied thereto, preferably from a source of compressed air, for instance, for this purpose use may be made of the compressed air system generally installed in a workshop. The pressure of the air is in part converted into velocity in the nozzle or nozzles 32, and on deflection of the air into the channels 36 a driving torque is produced on the impulse wheel 12. Due to the relatively great radial dimension of the channels 36, a back pressure is produced at the same time in the helix 34 due to a pumping action, said back pressure reducing the velocity of flow in the channels and thus in the nozzle. The air then continues through the annular channel 38 and is guided, without the use of guide blades, to the channels 42 of the reaction wheel 14, wherein the residual drop in pressure is transformed into work. It will be found advisable to utilise the major portion of the available drop in pressure, for instance about two-thirds of said drop in the impulse wheel.

A plurality of impulse wheels may be arranged in series one behind another. The requisite pressure drop in the turbine may be created by means of a vacuum pump, in which case inlet air entering the turbine will be at atmospheric pressure.

While one more or less specific embodiment of the invention has been shown, it is to be understood that this is for purposes of illustration only, and the invention is not to be limited thereby, but its scope is to be determined by the appended claim.

What I claim is:

An axially adjustable and pre-loaded bearing structure for a rotatable shaft, said bearing structure comprising a housing, an elongated cylindrical bore in said housing, a pair of axially spaced cylindrical sleeve members slidably disposed in said bore in coaxial relationship, each sleeve member having an axial length greater than the outer diameter thereof to provide a relatively long surface on each sleeve slidably engaging the surface of said bore, each sleeve having a substantially uniform diameter throughout the length thereof, a shaft extending through said sleeves in coaxial relationship, an annular groove in the inner surface of each sleeve adjacent the outer end thereof providing spaced outer bearing races, a pair of spaced annular grooves in the surface of said shaft opposite said first mentioned grooves providing spaced inner bearing races, a row of balls disposed in each pair of inner and outer races to rotatably mount said shaft, resilient means urging said sleeves axially in opposite directions to provide a unitary structure including said shaft, said sleeves, said resilient means and said balls, said unitary structure being freely slidable axially in either direction in said housing, and means in said housing exerting a radial force on the exterior cylindrical surface of one of said sleeve members to fix said last named member and said unitary structure in adjusted axial position.

References Cited in the file of this patent

UNITED STATES PATENTS

| | | |
|---|---|---|
| 2,511,675 | Monpain | June 13, 1950 |
| 2,588,459 | Annen | Mar. 11, 1952 |

FOREIGN PATENTS

| | | |
|---|---|---|
| 26,663 | Great Britain | 1911 |
| 457,206 | Italy | May 12, 1950 |